US011330251B2

(12) United States Patent
Rakshit et al.

(10) Patent No.: US 11,330,251 B2
(45) Date of Patent: May 10, 2022

(54) DEFINING A HOLOGRAPHIC OBJECT ALLOWANCE AREA AND MOVEMENT PATH

(71) Applicant: International Business Machines Corporation, Armonk, NY (US)

(72) Inventors: Sarbajit K. Rakshit, Kolkata (IN); James E. Bostick, Cedar Park, TX (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 16/249,437

(22) Filed: Jan. 16, 2019

(65) Prior Publication Data
US 2020/0228790 A1 Jul. 16, 2020

(51) Int. Cl.
*H04N 13/368* (2018.01)
*H04N 13/383* (2018.01)
(Continued)

(52) U.S. Cl.
CPC ........... *H04N 13/368* (2018.05); *G02B 30/56* (2020.01); *H04N 13/383* (2018.05); *H04N 13/388* (2018.05)

(58) Field of Classification Search
None
See application file for complete search history.

(56) References Cited

U.S. PATENT DOCUMENTS 8,139,197 B2 3/2012 Barnett et al.
8,803,917 B2 8/2014 Meehan
(Continued)

FOREIGN PATENT DOCUMENTS

CA 2532469 C 12/2012

OTHER PUBLICATIONS

"Creating high-resolution full-color moving holograms in 3-D", Feb. 4, 2015, Agency for Science, Technology and Research (A*STAR), Singapore, https://phys.org/news/2015-02-high-resolution-full-color-holograms-d.html, 3 pages.

*Primary Examiner* — Gelek W Topgyal
(74) *Attorney, Agent, or Firm* — Scully, Scott, Murphy & Presser, PC; Brian Restauro, Esq.

(57) ABSTRACT

A method, system and computer readable program storage device for controlling placement of a holographic object in a specified area. In an embodiment, the method comprises identifying, by one or more processors, at least one person in a specified area; determining by the one or more processors, a sight zone in the specified area for the identified at least one person; creating, by a holographic projector, a holographic object in the specified area; and controlling, by the one or more processors, a location of the holographic object to keep the holographic object out of said determined sight zone. In an embodiment, a group of persons are identified in the specified area as having no interest or a low interest in the holographic object, and an aggregate sight zone is determined for this group of persons. An allow zone, outside this aggregate sight zone, is determined for the holographic object, and the controlling a location of the holographic object includes keeping the holographic object in the allow zone.

17 Claims, 6 Drawing Sheets

(51) Int. Cl.
*H04N 13/388* (2018.01)
*G02B 30/56* (2020.01)

(56) References Cited

U.S. PATENT DOCUMENTS

| | | | |
|---|---|---|---|
| 8,836,530 B1* | 9/2014 | Bowers | G06F 21/32 |
| | | | 340/686.6 |
| 2011/0128555 A1 | 6/2011 | Rotschild et al. | |
| 2013/0258089 A1 | 10/2013 | Lyons et al. | |
| 2013/0335405 A1 | 12/2013 | Scavezze et al. | |
| 2013/0342572 A1* | 12/2013 | Poulos | G06F 3/012 |
| | | | 345/633 |
| 2016/0042562 A1 | 2/2016 | Haswell et al. | |
| 2016/0154458 A1* | 6/2016 | Liu | H04N 13/383 |
| | | | 348/40 |
| 2018/0120944 A1* | 5/2018 | Wang | G06F 3/013 |

* cited by examiner

STEP 0: PREREQUISITES AND PRE-CONFIGURATION
302 — 1. PREREQUISITES
304 — 2. PRE-CONFIGURATION
    306 — 1. PEER-TO-PEER COMMUNICATION WITH DEVICES.
    310 — 2. ATTENTIVENESS THRESHOLD

STEP 1: IDENTIFY ACTIVE USER FOCUS, ATTENTIVENESS AND VIEWING ANGLE
320 — 1. CAPTURE OF VIEWING DATA FROM CAMERA
322 — 2. ANALYZE GATHERED VIDEO AND IMAGE DATA TO FIND PRIMARY FIELD OF VIEW OF EACH AND EVERY USER
324 — 3. IDENTIFY THE USERS WHO ARE NOT INTERACTING WITH HOLOGRAPHIC OBJECTS AND CALCULATE THE AGGREGATED PRIMARY FIELD OF VIEW OF THOSE USERS

STEP 2: DEFINE ZONES TO CREATE PROJECTED 3D HOLOGRAPHIC OBJECT WITHOUT OBSTRUCTING ACTIVE USER VIEW IN ENVIRONMENT
326 — 1. AGGREGATE THE GATHERED PRIMARY FIELD OF VIEW OF EACH OF THE USER AND CREATE THE RESTRICTED HOLOGRAPHIC OBJECT ZONE.
330 — 2. CONSIDER AVOIDING RENDERING OF HOLOGRAPHIC OBJECTS OVER OTHER OBSTACLES
332 — 3. DETERMINE SIZE AND SHAPE OF HOLOGRAM SO AS TO NOT OBSTRUCT VIEW OF USERS IN THE ENVIRONMENT

STEP 3: DEFINE PATH THROUGH ZONES TO ALLOW PROJECTED 3D HOLOGRAPHIC OBJECT MOVEMENT WITHOUT OBSTRUCTING ACTIVE USER VIEW IN ENVIRONMENT
334 — 1. DEFINE AN AGGREGATED PRIMARY FIELD OF VIEW
336 — 2. CHANGE THE SHAPE OR ORIENTATION OF THE HOLOGRAPHIC OBJECTS WHILE MOVING THE HOLOGRAPHIC OBJECTS AROUND THE ENVIRONMENT
340 — 3. IDENTIFY THE ROUTE OF THE MOVING HOLOGRAPHIC OBJECTS IN SUCH A WAY THAT NO USERS ARE IMPACTED, AND ALSO DECIDE DIMENSION, SHAPE, AND ORIENTATION OF THE HOLOGRAPHIC OBJECTS

FIG. 3

DEFINING A HOLOGRAPHIC OBJECT ALLOWANCE AREA AND MOVEMENT PATH

BACKGROUND

This invention, generally, relates to creating holographic objects, and more particularly, to controlling the placement and movement of the holographic objects. Even more specifically, embodiments of the invention relate to controlling the placement and movement of holographic objects, generated by or for one or more persons in an area, to avoid creating obstacles to the views of other persons in the area.

A holographic object is a three-dimensional object that can be created in midair. Using multiple holographic projectors installed in a room or environment, participating users can share and manipulate information and play games with holographic objects. People in the surrounding area of the holographic image can view the object. In some cases, the people in the surrounding area may want to view the object or watch others interact with the three-dimensional object.

SUMMARY OF THE INVENTION

Embodiments of the invention provide a method, system and computer readable program storage device. In an embodiment, the method comprises identifying, by one or more processors, at least one person in a specified area; determining by the one or more processors, a sight zone in the specified area for the identified at least one person; creating, by a holographic projector, a holographic object in the specified area; and controlling, by the one or more processors, a location of the holographic object to keep the holographic object out of said determined sight zone.

In an embodiment, the identifying at least one person in the specified area includes identifying a group of persons in the specified area as not being interested in, or having a low interest in, the holographic object; and the determining a sight zone in the specified area includes determining an aggregate sight zone for said group of persons. In this embodiment, the controlling a location of the holographic object includes determining an allow zone for the holographic object outside of the aggregate sight zone, and keeping the holographic object in the allow zone.

In an embodiment, a plurality of persons are in the specified area; and the identifying at least one person in the specified area includes separating the plurality of persons in the specified area into a first group and a second group based on defined attentiveness of the plurality of persons to the holographic object, said first group of persons having an attentiveness to the holographic object below a specified level. In this embodiment, the determining a sight zone in the specified area includes determining an aggregated field of view for said first group of persons, and determining the sight zone from said aggregated field of view.

Embodiments of the invention determine an allowed zone in which to create a projected three-dimensional holographic object, in mid air, of different sizes and shapes within the allowed zone, and that does not create an obstacle to other users in the environment who are engaged in different activities requiring a line of sight.

Embodiments of the invention provide the ability to define a path in allowed zones in which a three-dimensional holographic object can be moved and manipulated with recalculation of different sizes and shapes within the allowed zones. When the holographic object is kept in this path, the holographic object does not create an obstacle to other users in the environment who are engaged in different activities requiring a line of sight.

Embodiments of the invention provide a method and system by which:

Cameras are used in a holographic environment to identify an active user focus, attentiveness, viewing angles, and obstacles;

Rendering of holographic objects over other obstacles is avoided;

Zones are defined in which to create projected three-dimensional holographic object movement without obstructing active user views in the environment; and A path is defined through the zone to allow projected three-dimensional holographic object movement without obstructing active user views in the environment.

Embodiments of the invention avoid rendering of holographic objects over other obstacles. For example, having an object generated half way through a coffee table would look odd, and embodiments of the invention avoid other obstacles using a camera setup.

Existing holographic systems are built independent of each other. Embodiments of the invention address the problem of users engaged in multiple activities of different types interacting in a common area including three-dimensional holograms, to determine users focus and attention. In embodiments of the invention, a holographic object is created in an area that does not obstruct the viewing angle of other users within the environment, and the holographic object does not obstruct the views of these other users when the holographic object is being moved.

BRIEF DESCRIPTION OF THE SEVERAL VIEWS OF THE DRAWINGS

FIG. 3 shows a method in accordance with an embodiment of the invention.

DETAILED DESCRIPTION

By using multiple holographic projectors installed in a room or environment, participating users can share and manipulate information and play games with holographic objects. People in the surrounding area of the holographic image can view the object. In some cases, the people in the surrounding area may want to view the object or watch others interact with the three-dimensional object.

In other cases, however, some people in the surrounding area may be interested in performing or engaging in a different activity within the same environment, such as engaging in a discussion with others in a room, watching a movie, browsing through Internet content, or looking at a television. The holographic object created in the area may interfere with the activities these people want to engage in.

Embodiments of the invention address problems with three-dimensional holographic image projection in multi person and activity environments. In such environments, a created three-dimensional holographic object may be an obstacles to other users' views. In environments with other users engaged in activities in the same area, a three-dimensional holographic image created in mid air could be an obstacle to another user or users engaged in a different activity in the same room. In addition, the movement of a three-dimensional holographic object may become an obstacle to other users' views. During the viewing and manipulation of three-dimensional holographic objects, the objects can move in mid air, and thus the paths these holographic objects take could obstruct the views of others engaged in other activities.

Figure 1:
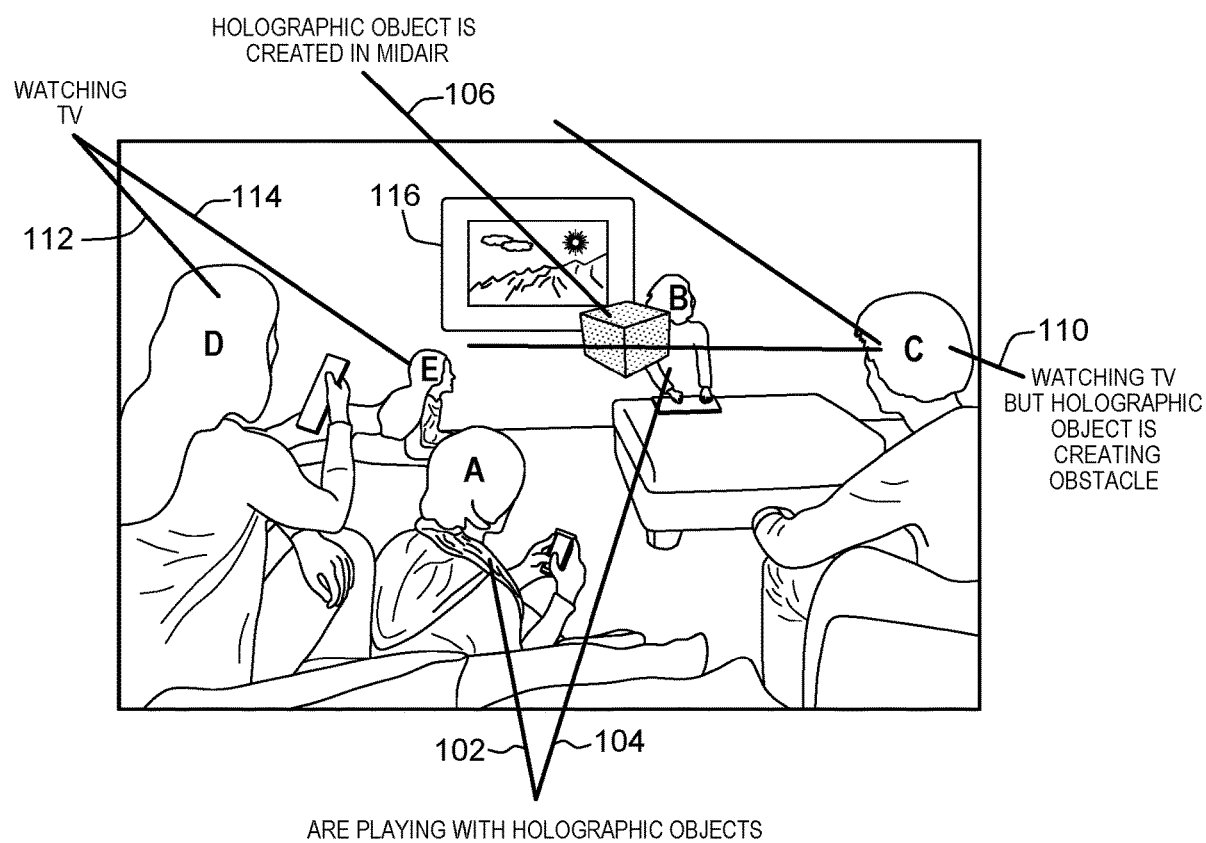
FIG. 1 depicts an example of how a holographic object created by one user can be an obstacle to another user.

FIG. 1 depicts an example of how a holographic object created by one user can create an obstacle to another user. Users A 102 and B 104 are playing with holographic objects 106 in a game. As per the logic in the game, the holographic objects are moving in the surrounding area. In this example, users C 110, D 112 and E 114 are watching TV 116. The holographic object is an obstacle in the primary field of view of the user C 110 watching the television. In this game, a holographic object can move its position in mid air, and thus the holographic object, in time, could potentially also impact the views of users C, D and E.

There is a need for a method and system by which the holographic objects are created in mid air in a way that does not create an obstacle, and move in way that does not create an obstacle, to other users engaged in other activities within the environment.

In embodiments of the invention, a new dynamic holographic image is generated in real time, that is then displayed in a manner that, when viewed by users, is not impeded by any physical object in the line of sight by each respective user. This modifies/improves the user experience with a display/display surface. This, in embodiments of the invention, is achieved by calculating particular zones, determining eye placement of each respective user and objects within the line of sight of the gaze of each respective user. The dynamic holographic image is then projected and modified accordingly in response to each user's line of sight/gaze/eye placement.

Figure 2:
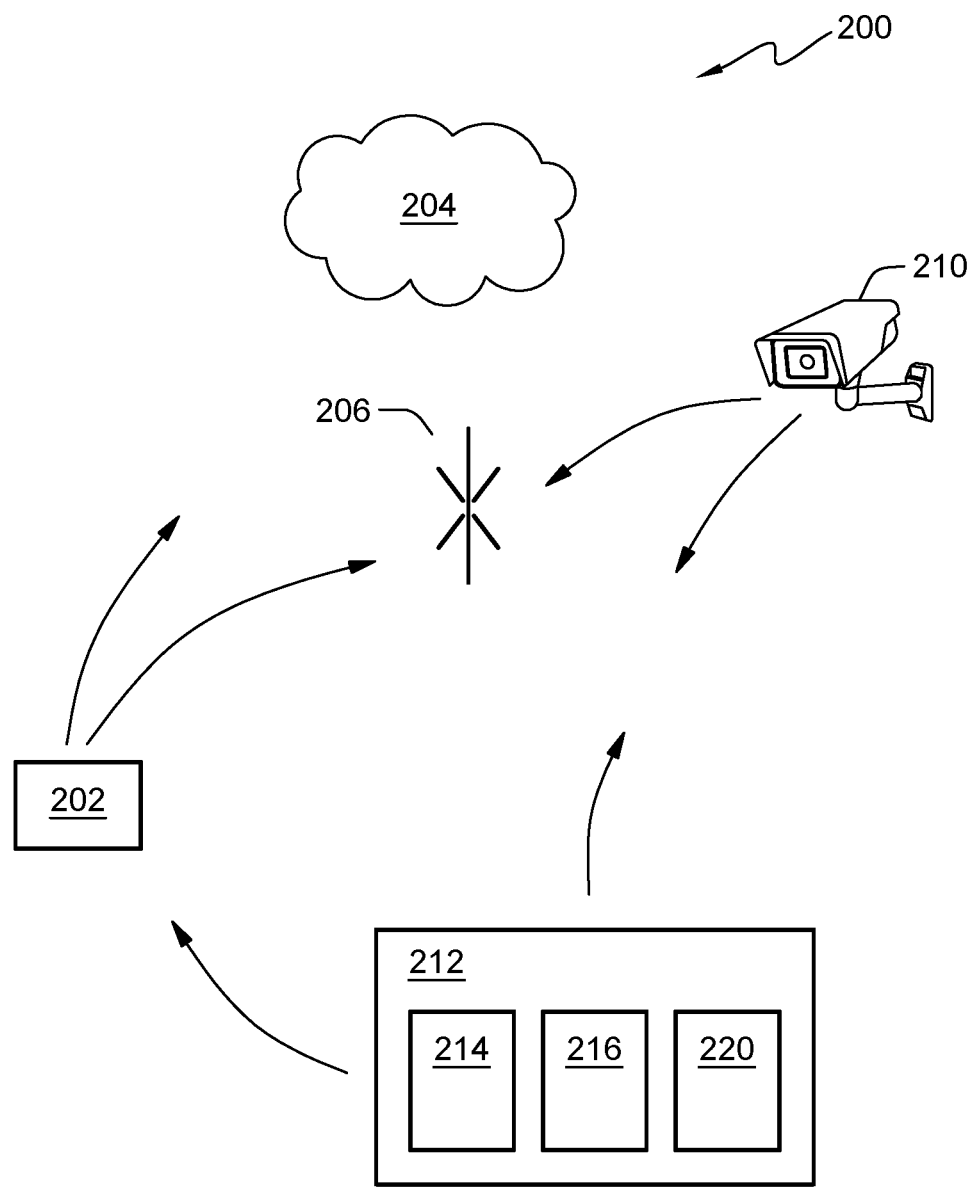
FIG. 2 illustrates a holographic object creation system in accordance with an embodiment of the invention.

FIG. 2 illustrates a system 200 in accordance with an embodiment of the invention. In this embodiment, system 200 comprises holographic projection device 202 (i.e., a smart television, game console, tablet, etc.), network communications 204 with controlling or peer holographic devices 206, projection of 3D Holographic objects, and one or more cameras 210 that is used to detect viewing angles of participants. In this system, communication between devices is used to inform the devices of projection coordinates and movement paths for holograms.

System 200 also includes a processing unit 212. In embodiments of the invention, processing unit 212 is provided with a group of software components 214, 216 and 220. Component 214 is used to identify an active user focus, attentiveness and viewing angles, and component 216 is used to define zones in which to create projected three-dimensional holographic objects without obstructing the active user view in the environment. Software component 220 is used to define a path through the defined zones to allow projected three-dimensional holographic object movement without obstructing the active user view in the environment. An external camera or cameras can be added to the environment to augment multi activity/user environment viewing angles.

FIG. 3 shows a method in accordance with an embodiment of the invention. This embodiment of the method comprises four major steps:

Step 0: Prerequisites and pre-configuration;
Step 1: Identify active user focus, attentiveness and viewing angle;
Step 2: Define zones in which to create a projected three-dimensional holographic object without obstructing active user view in the environment; and
Step 3: Define a path through the zones to allow projected three-dimensional holographic object movement without obstructing active user view in environment.

Each of these steps includes a plurality of component steps or sub-steps.

Step 0 includes two sub-steps: Prerequisites 302 and Pre-configured 304. At the Prerequisites step 302, the components of the system 200 are assembled, as for example shown in FIG. 2. At the Pre-configuration step 304, the components of the system are configured for the desired operation, and this step, in turn, includes Peer-to-Peer Communication with devices 306, and Attentiveness Threshold 310. Components of system 200 establish Peer-to-Peer Communication with devices in sub-step 306, and this Peer-to-Peer communication includes configuration of the devices of the system in a peer-to-peer network (such as wifi or Bluetooth) to provide projection coordinates of a hologram.

At the Attentiveness Threshold sub-step 310, one or more thresholds used to determine the attentiveness of persons are determined. For instance, the system 200 can be configured to determine a number of seconds a person can look away from a specified viewpoint as a measure of attentiveness. The system can also be configured to determine a number of times per minute or other defined period (i.e., 15 min., 30 min., 1 hr., etc.) that a user can look away as a measure of attentiveness. These thresholds can be configured per user or for all users.

Step 1, as mentioned above, is to identify user focus, attentiveness and viewing angles. This step includes a number of sub-steps, and a first sub-step 320 is the capture of viewing data from cameras 210. In this sub-step 320, cameras 210 installed in the holographic projection ecosystem identify the focus direction of various users. This can change over time in an environment with more than one object/person of focus (i.e., television, portable holographic gaming system, interaction with other people in room. Cameras 210 may also be used to determine the users' attention levels to the focus area based on thresholds configured for attentiveness, and cameras 210 may be used to observe other objects in the environment that would obstruct the view of the projected hologram. The data from the cameras 210 is streamed to the hologram projection device or devices 202.

Holographic content can be classified as confidential or non confidential, or rated for consumption in a way similar to the way that movies are rated for content (ie. G, PG, PG-13 R). In embodiments of the invention, users within a given area are identified from facial, voice and other forms of identification (i.e., login to game console) and the user's security profile will determine what type of content a user can view, either based on access to classified content or rating of content for a given age. Content displayed in the holographic object is evaluated based on the contents classification and content rating. In cases in which the content displayed is deemed appropriate for users within the viewing angle, the content is displayed. In cases in which the content is deemed not appropriate, the content and/or the zone with users not authorized to see the content, is blocked from projecting hologram into that area. In cases in which the content is deemed sensitive, the primary user or owner of the content is provided a mechanism to over-ride or provide consent for other users to see the content (i.e., personal email, electronic messaging service, etc.).

In embodiments of the invention, there are video cameras and microphones within the environment capturing input of the users and interactions with various devices and each other. The video content and audio content are streamed to a cognitive/AI system to process to determine the viewing angles and interactions among the users. Using known procedures, a video can be used to determine the viewing angle of a user and therefore determine what object they are looking at within an environment. In case of audio, the cognitive/AI system can use natural language processing to determine if users are engaged in a conversation with each other in addition to the viewing angle they are each looking at each other. Procedures for capturing audio and video content and for determining viewing angles are known in the art.

At the sub-step 322, software installed in one or more devices in the holographic ecosystem analyzes the gathered video and image data to find the primary field of view of each and every user based on their facial and focus direction. The holographic ecosystem includes the invention components in the system 200 and the environment such as external cameras. The software on processing unit 212 receives captured video/images from cameras in the environment of the users' lines of sight or fields of view in the environment for analysis.

In the analysis, the software is receiving video/image input from cameras in the environment, and location awareness. The software determines the location of the user(s) within the room. This can be done from location awareness software in system 200 or from camera determination of the distance from a location of users/devices. Software can stream video/images of objects to be identified using object recognition techniques locally or streamed to a remote cognitive system for image analytics. Software determines what the user is looking at from eye gaze detection. Any suitable procedure may be used to determine what a user is looking at from eye gaze detection, and a number of suitable procedures are known in the art; Also, software can determine how long a user is looking at an object based on eye gaze.

Figure 4:
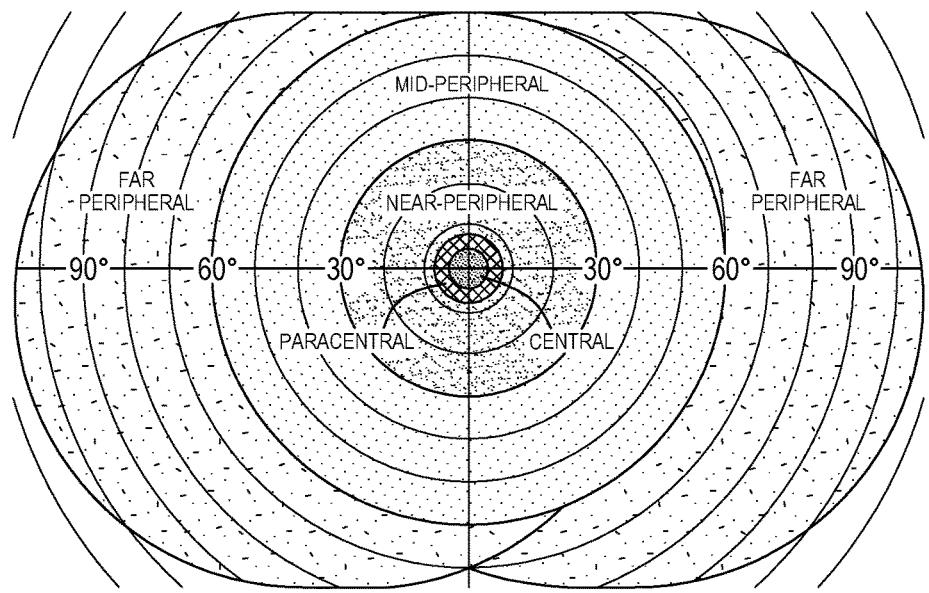
FIG. 4 depicts a user's primary focus area.

FIG. 4 depicts a user's primary focus area. A user's primary focus area lies on the near-peripheral view. Thus, if a user has focused their attention on watching specific content, then the content should be in the near-peripheral vision area. A user can also view the content outside of the primary focus area. A number of procedures are known for determining the primary focus area of a user, and any suitable procedure may be used in embodiments of the invention.

With reference to FIG. 3, at sub-step 324, software installed in the holographic projection ecosystem identifies the users who are not interacting with the holographic objects, and accordingly will calculate the aggregated primary field of view of those users. As discussed above, embodiments of the invention use eye gaze to determine what a user is looking at, the user's line of sight, and how long (attentiveness) a person is looking at an object. A user can be identified as not interacting with the holographic object when the user does not have eye gaze focus on the object, or does not have the object in his or her line of sight, or is not directly interacting with the holographic object. These will be known when the user has no interactive gestures or controls with the object.

Figure 5:
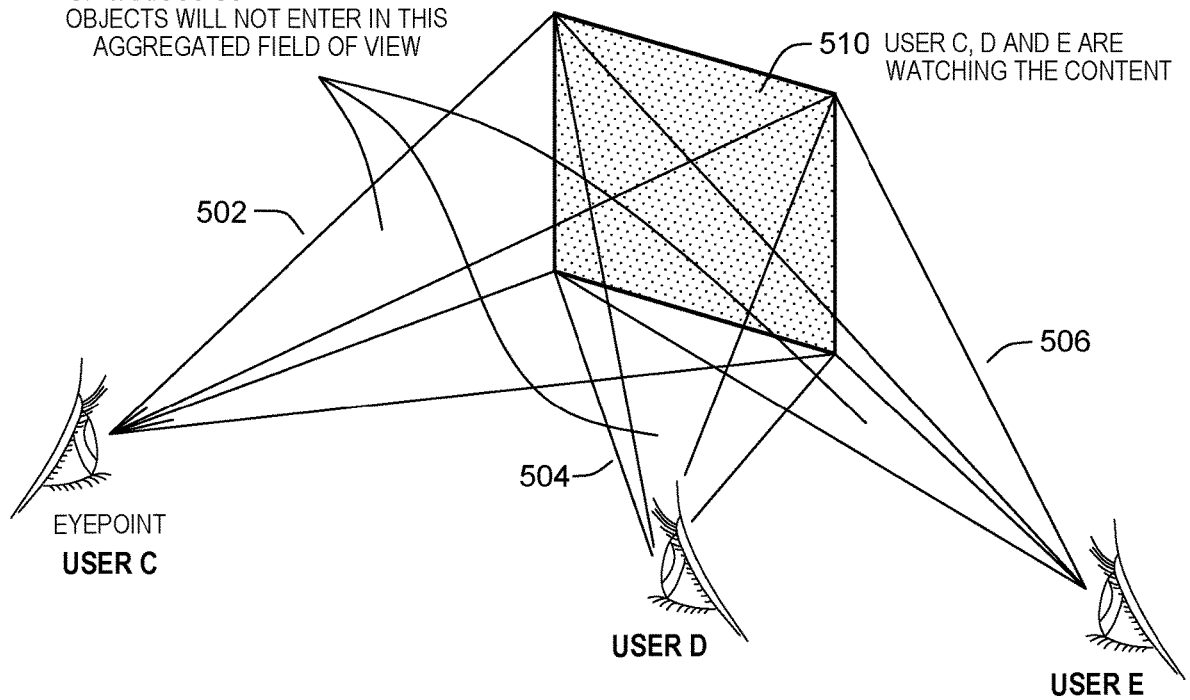
FIG. 5 shows an example of an aggregated primary field of view of multiple users.

FIG. 5 depicts an aggregated primary field of view of multiple users looking at a common object. This aggregated primary field of view is comprised of three separate primary fields of view 502, 504 and 506 of each of users C. D and E respectively. There are situations when different people are looking at different areas.

In the example of FIG. 5, three users (C, D, E) are positioned in different locations within a room and are watching content on the display 510. The aggregated primary field of view is calculated individually to the object of focus, and then mapped collectively in the space such that holographic objects are not projected within the line of sight of the users observing content on the display 510.

The following is an example of an aggregated primary field of view calculation. The location of the object of focus within the room is determined. That object or device, such as a smartTV, can have location awareness information accessible to software used in embodiments of the invention. Alternatively, the location of the object can be determined from eye focus and a distance calculation. User C's primary field of view is calculated based on C's current position and his or her line of sight to the object. This is repeated from the location of each user (i.e., D, E) to the location of the object of the user's eye focus. The primary field of view for each user is plotted to create an aggregated primary field of view relative to the object of each user's focus. Any suitable procedure may be used for a field of view calculation, and a number of suitable procedures are known in the art.

Plotting a holographic object in the aggregated primary field of view will create a disturbance to one or more of these users. If any user wants to create the holographic object, then, in embodiments of the invention, the projection ecosystem plots the holographic objects outside of the aggregated primary field of view of all the participating users. When the holographic objects are moving, the projection system 200 attempts to automatically find a route for the holographic objects such that no users are disturbed or obstructed by the moving holographic objects.

When determining possible areas to project the 3D object within the space, there is a need to consider the users' primary field of view such that they can view the object as well as a need to consider if another user can view the object if multiple person interaction is required. Depending on the task and content type, the object may require a primary field of view (i.e., central 5 degrees, or paracentral 8 degrees), or if lesser focus is required near, peripheral to the secondary user may be acceptable (i.e., 30 degrees).

With reference to FIG. 3, step 2 defines zones in which to create a projected three-dimensional holographic object without obstructing active user view in the environment. At sub-step 326, the holographic ecosystem aggregates the gathered primary field of view of each of the users, and accordingly the restricted holographic object creation zone is created. At 330, zone definition and dimensions considers avoiding rendering of holographic objects over other obstacles. For example, having a holographic object generated half way through a coffee table would just look odd and would probably not be desirable, and so the projection system 200 also looks to avoid other obstacles using the camera setup. The defined zone dimensions created for the hologram may be used as input, at sub-step 332, to determine the size and shape of the created hologram so as to not obstruct the views of users in the environment.

Step 3 defines a path through the zone to allow projected three-dimensional holographic object movement without obstructing active user view in the environment. Each zone is a representation of areas that may be defined as a primary field of view for users and objects, as defined by a plotted aggregated primary field of view. Conversely, a zone can be defined as space that does not have primary field of view and thus can have holographic objects projected in the space without creating an obstruction. With reference to FIG. 5, the aggregated primary field of view shows areas in which the holographic object should not be projected for the scenario in which users are watching a television display. When adding another scenario, such as hand held gaming device, in same space, it is desirable to prevent those devices from projecting a holographic object that would obstruct the television display. The space or zone plotted outside the aggregated primary field of view is a zone in which a holographic object from a hand held game device could be projected. The eye gazes of users are monitored from cameras in the environment. In embodiments of the invention, this is a iterative process. If the users get up and change positions or people enter or exit the space, the calculations may be redone.

At sub-step 334, the holographic projection defines the aggregated primary field of view of those users as a restricted zone to holographic object movement. Accordingly, the holographic projection ecosystem identifies the remaining areas or zones where the holographic objects can travel.

At sub-step 336, components 214, 216, and 220 communicate with processing unit 212 to automatically change the shapes or orientations of the holographic objects while moving the holographic objects around the environment based on the dimension of the zone and the shapes or orientations of the holographic objects. Some allowed paths may be narrow or uneven spaces, and thus to ensure the smooth movement of the holographic objects, the holographic projectors recalculate the shapes, dimensions, or orientations of the holographic objects, and the holographic objects travel accordingly. At sub-step 340, the holographic projection system identifies the route of the moving holographic objects in such a way that no users are impacted, and the projection system also decides the dimensions, shapes, and orientations of the holographic objects.

Figure 6:
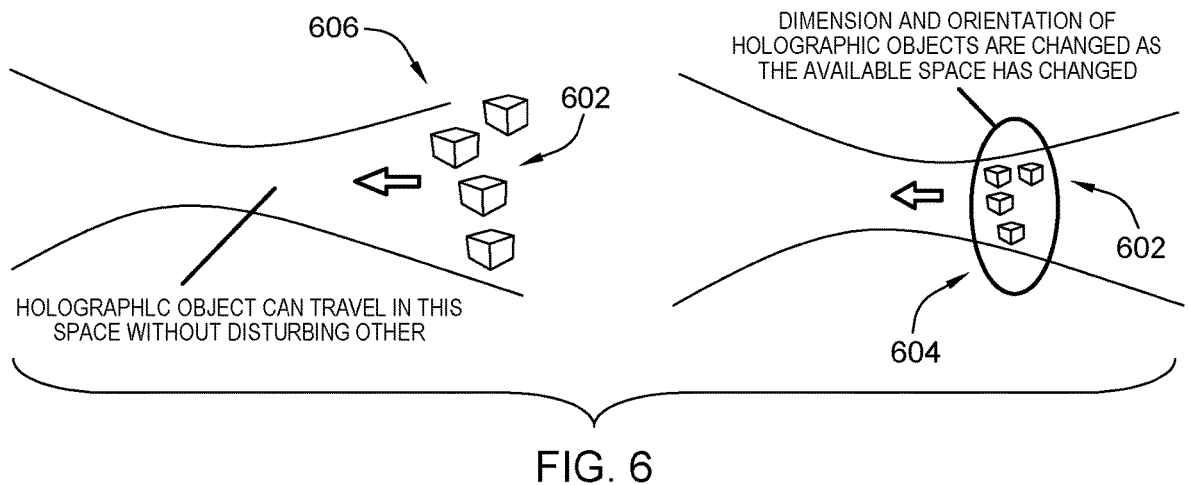
FIG. 6 depicts how, in an embodiment of the invention, the shape, orientation, and dimension of holographic objects can change while moving.

FIG. 6 depicts how the shapes, orientations, and dimensions of holographic objects 602 may change while travelling from one point 604 to another point 606 without disturbing other persons in the area.

When the 3D holographic object exists in a zone, the holographic image has specific dimensions and shape that define the space that it takes up within the current zone. When an obstruction is determined and the new zones are determined to be free of obstruction, there is a need to transition the 3D object from the existing zone to the new zone. There are a number of options for this. As a first example, the holographic object is moved from one zone to another with brief obstruction while being moved. As a second example, the holographic object takes an object movement path to the new zone without obstruction. In this case, the path between the original zone and new zone is evaluated to determine if the size of the path is equal or greater than the current size of the 3D holographic object. If the size of the path is not equal to or greater than the current size of the 3D holographic object, the holographic object is resized, for example, to the maximum allowable size through the movement path and then the holographic object is resized to its original size once in the new zone such that the holographic object does not create an obstruction during movement.

Figure 7:
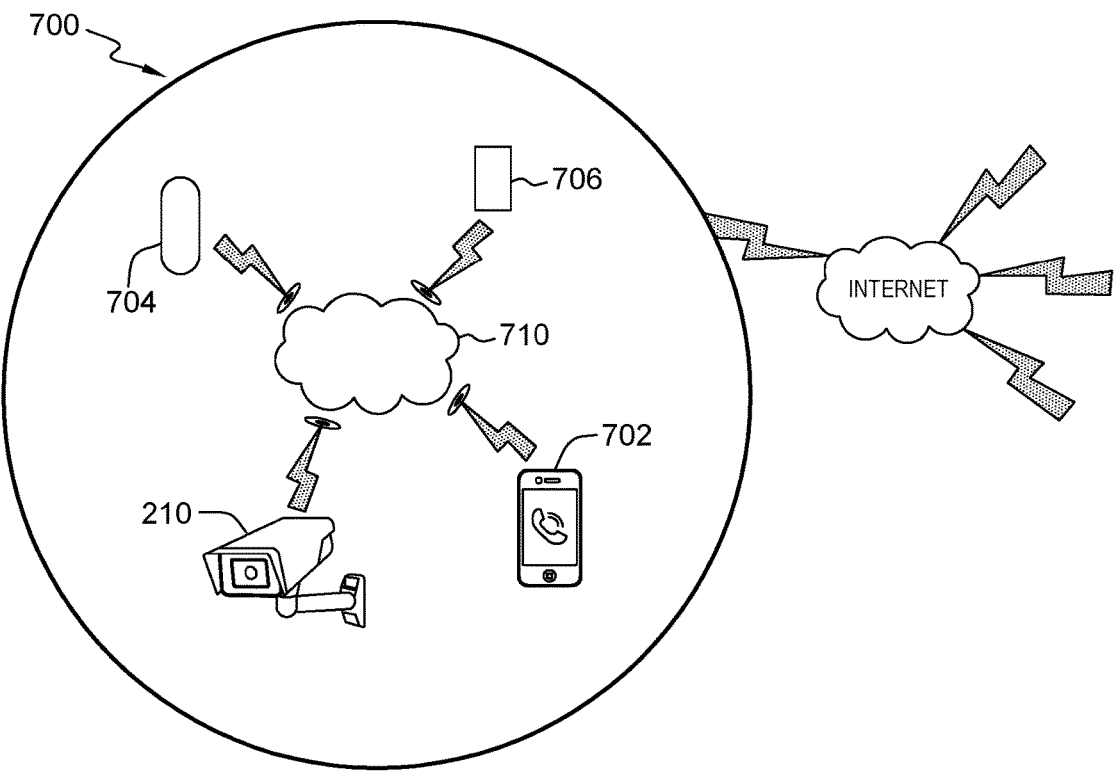
FIG. 7 illustrates a network that may be used in the system of FIG. 2.

As mentioned above, system 200 of FIG. 2 comprises network communications with controlling or peer holographic devices, and FIG. 7 illustrates a network communication 700 that may be used in embodiments of the invention. As represented in FIG. 7, a variety of devices may be used to obtain data to determine the viewpoints and other characteristics of the persons in an area. These devices include, for example, camera 210. Other devices may also be used including, for example, a cell phone 702 and sensor or detectors, represented at 704 and 706.

The devices of network 700 may communicate directly or indirectly with each other and with holographic projector 202 of system 200; and the devices of the network may be provided with suitable input and output components to communicate with each other. A communication system 710 may be provided to facilitate communications between the devices of the network. Network 700 may also be provided with a server (not shown) to receive, process and transmit data from and to other devices in the network.

If desired, network 700 may be connected to the Internet to receive data from and to transmit data to the Internet, and the network 700 may be provided with additional or alternative devices than are shown in FIG. 7 to facilitate collection of data and the transmission of data among and between the devices of the network. As will be appreciated by those of ordinary skill in the art, the network 700 of FIG. 7 is intended as an example, and not as a limitation for the invention.

Figure 8:
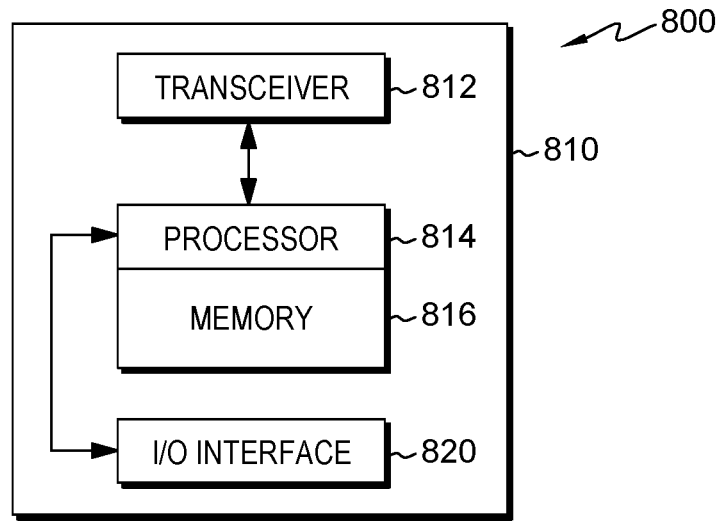
FIG. 8 schematically shows a device that may be used in the network of FIG. 7.

FIG. 8 illustrates an example of a device 800 that may be used in embodiments of the invention in network 700 to collect and/or process data about persons in an area. While internal components of devices 800 can be embodied with different hardware configurations, a basic high-level configuration for internal hardware components is shown as platform 810 in FIG. 8. The platform 810 can receive and execute software applications, data and/or commands transmitted over a network interface and/or a wired interface. The platform 810 can also independently execute locally stored applications. The platform 810 can include one or more transceivers 812 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 814, such as a microcontroller, microprocessor, application specific integrated circuit, digital signal processor (DSP), programmable logic circuit, or other data processing device, which will be generally referred to as the processor 814.

The processor 814 can execute application programming instructions within a memory 816 of the device 800. The memory can include one or more of read-only memory (ROM), random-access memory (RAM), electrically erasable programmable ROM (EEPROM), flash cards, or any memory common to computer platforms. One or more input/output (I/O) interfaces 820 can be configured to allow the processor 814 to communicate with and control various I/O devices and any other devices, such as sensors, actuators, relays, valves, switches, etc. associated with the device 800. While not shown explicitly as part of the device 800, the device may include one or more external antennas and/or one or more integrated antennas that are built into an external casing or housing, including but not limited to Wi-Fi antennas, cellular antennas, satellite position system (SPS) antennas (e.g., global positioning system (GPS) antennas), and so on.

Figure 9:
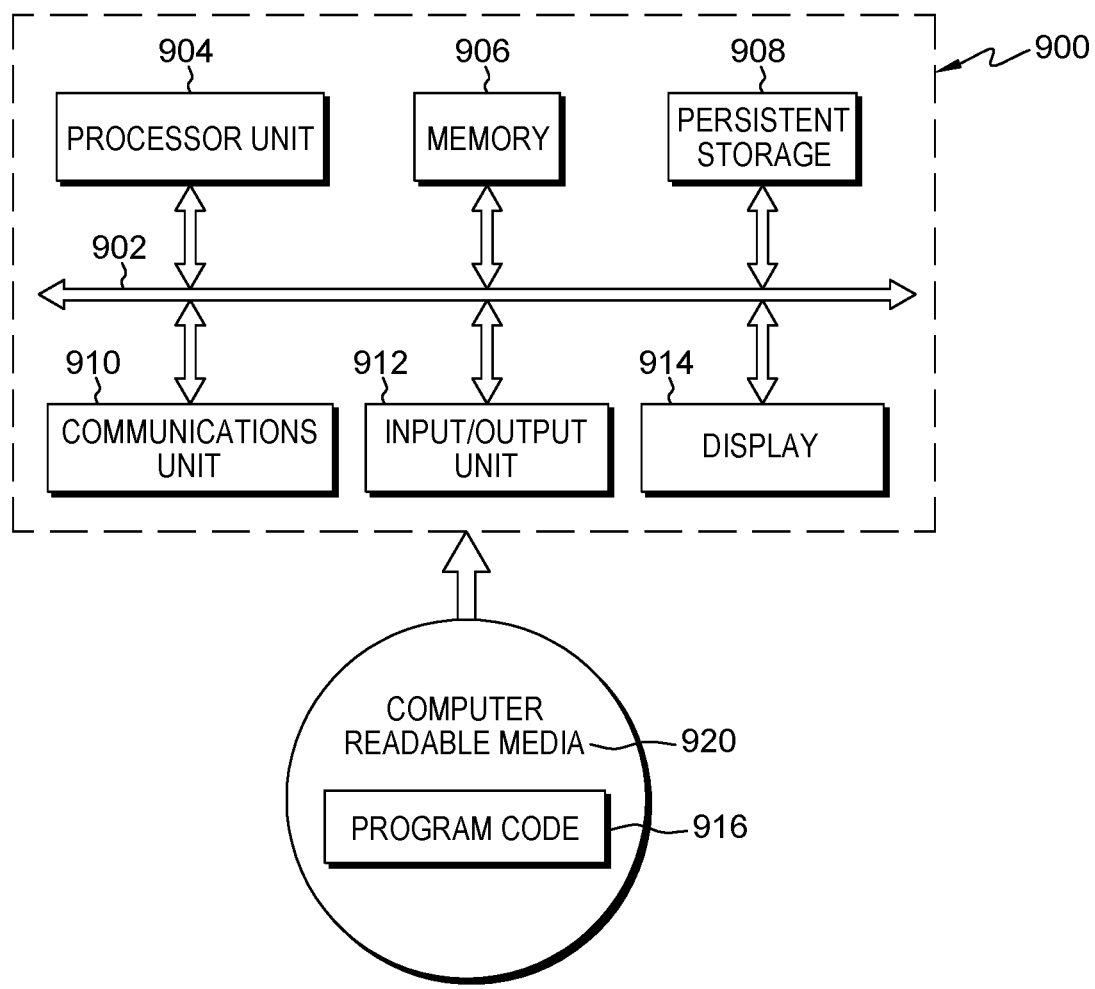
FIG. 9 shows a processing unit that may be used in the system of FIG. 2 and the method of FIG. 3.

With reference to FIG. 9, a block diagram of a data processing system 900 is shown. Data processing system 900 is an example of a processing unit that may be used in, or with system 200 of FIG. 2. Data processing system 900 may also be used in or with network 700 of FIG. 7 or in or directly with device 800 of FIG. 8.

In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a set of one or more processors or may be a multi-processor core, depending on the particular implementation. Memory 906 and persistent storage 908 are examples of storage devices. Memory 906, in these examples, may be a random access memory or any other suitable volatile or non-volatile storage device. Persistent storage 908 may take various forms depending on the particular implementation. For example, persistent storage 908 may be a hard drive, a flash memory, a rewritable optical disk, a rewritable magnetic tape, or some combination of the above.

Communications unit 910, in these examples, provides for communications with other data processing systems or devices. In these examples, communications unit 910 is a network interface card. Communications unit 910 may provide communications through the use of either or both physical and wireless communications links. Input/output unit 912 allows for input and output of data with other devices that may be connected to data processing system 900. For example, input/output unit 912 may provide a connection for user input through a keyboard and mouse. The input/output unit may also provide access to external program code 916 stored on a computer readable media 920. In addition, input/output unit 912 may send output to a printer. Display 914 provides a mechanism to display information to a user.

Those of ordinary skill in the art will appreciate that the hardware in FIG. 9 may vary depending on the implementation. Other internal hardware or peripheral devices, such as flash memory, equivalent non-volatile memory, or optical disk drives and the like, may be used in addition to or in place of the hardware depicted in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method comprising:
   creating, by a holographic projector, a three-dimensional (3D) holographic object in mid-air in a specified area of the real world environment;
   identifying, by one or more processors, a multitude of persons engaged in activities requiring line-of-sight viewing of objects within the specified area of the real world environment, the identifying including identifying a first group of persons from said multitude of persons in the specified area as having an aggregated line of sight viewing of another object and a collective attentiveness to the 3D holographic object below a specified level indicating no interest or a defined low interest in line-of-sight viewing of the 3D holographic object and including identifying a second group of persons engaged in an activity involving said 3D holographic object;
   determining by the one or more processors, an aggregate sight zone corresponding to aggregated said line-of-sight viewing of the another object in the specified area for the identified first group of persons while engaged in said activities; and
   controlling, by the one or more processors, the holographic projector to control a location of the 3D holographic object to keep the holographic object outside of said determined aggregate sight zone, said controlling the holographic projector comprising:
   determining an allow zone for the 3D holographic object outside of the aggregate sight zone;
   keeping the holographic object in the allow zone; and
   moving the holographic object from one location in the allow zone to another location in the allow zone, including identifying a path within the allow zone, between said one location and said another location, wherein:
   the holographic projector controlling a location of the holographic object includes keeping the 3D holographic object in said path as the 3D holographic object moves from said one location to said another location while said second group of persons engage in said activity involving said 3D holographic object.

2. The method according to claim 1, wherein the keeping the holographic object in said path includes:
   changing at least one of a size of the holographic object, a shape of the holographic object, and an orientation of the holographic object as the holographic object moves in said path from said one location to said another location to keep the holographic object in said path as the holographic object moves from said one location to said another location.

3. The method according to claim 1, wherein:
   a multitude of persons are in the specified area; and
   the identifying at least one person in the specified area includes identifying a plurality of persons of the multitude of persons in the specified area;
   the determining a sight zone in the specified area includes determining lines of sight for the identified plurality of persons in the specified area, and
   using said determined lines of sight to determine the sight zone.

4. The method according to claim 1, wherein:
   a plurality of persons are in the specified area; and
   the identifying at least one person in the specified area includes identifying at least one of the plurality of persons in the specified area as having a defined interest in the holographic object below a specified threshold.

5. The method according to claim 1, wherein:
   a plurality of persons are in the specified area;
   the identifying at least one person in the specified area includes separating the plurality of persons in the specified area into a first group and a second group based on defined attentiveness of the plurality of persons to the holographic object, said first group of persons having an attentiveness to the holographic object below a specified level; and
   the determining a sight zone in the specified area includes determining an aggregated field of view for said first group of persons, and determining the sight zone from said aggregated field of view.

6. The method according to claim 5, wherein the separating the plurality of persons in the specified area into a first group and a second group includes:
generating video data of the plurality of persons in the specified area, and
using the video data to determine said defined attentiveness and to separate the plurality of persons into the first group and the second group.

7. The method according to claim 5, wherein the separating the plurality of persons in the specified area includes:
identifying first and second activities of the plurality of persons in the specified area;
identifying one or more of the plurality of persons in the specified area as engaged in the first activity, and identifying one or more of the plurality of persons in the specified area as engaged in the second activity; and
grouping the identified one or more persons engaged in the first activity into the first group, and grouping the identified one or more persons engaged in the second activity into the second group.

8. The method according to claim 5, wherein a specified level of attentiveness comprises a threshold time duration a person looks away from a specified viewpoint, said method further comprising:
monitoring how long a user looks away from a specified viewpoint to determine that user's attentiveness to the holographic object.

9. The method according to claim 5, wherein a specified level of attentiveness comprises a threshold number of instances a person looks away from a specified viewpoint in a defined time period, said method further comprising:
determining a number of times instances a person looks away from a specified viewpoint in a defined time period to determine that user's attentiveness to the holographic object.

10. The method according to claim 1, wherein the controlling a location of the holographic object includes:
determining an allow zone for the holographic object outside the determined sight zone; and
keeping the location of the holographic object in the allow zone.

11. A system comprising:
a holographic projector for generating a three-dimensional (3D) holographic object in mid-air in a specified area of a real world environment;
a user identification system for identifying at least one person of a multitude of persons engaged in activities requiring line-of-sight viewing of objects within the specified area of the real world environment, the identifying including identifying a first group of persons from said multitude of persons in the specified area as having an aggregated line of sight viewing of another object and a collective attentiveness to the 3D holographic object below a specified level indicating no interest or a defined low interest in line-of-sight viewing of the 3D holographic object and including identifying a second group of persons engaged in an activity involving said 3D holographic object; and
a control system for determining an aggregate sight zone corresponding to said aggregated line-of-sight viewing of the another object in the specified area for the identified first group of persons while engaged in said activities, and for controlling the holographic projector to control a location of the 3D holographic object in the real world environment to keep the 3D holographic object outside of said determined aggregate sight zone, said control system further determining an allow zone for the holographic object outside of the aggregate sight zone; controlling the holographic projector to keep the 3D holographic object in the allow zone, the holograph projector controlling:
moving the holographic object from one location in the allow zone to another location in the allow zone, including identifying a path within the allow zone, between said one location and said another location, wherein:
the controlling a location of the holographic object includes keeping the 3D holographic object in said path as the 3D holographic object moves from said one location to said another location while said second group of persons engage in said activity involving said 3D holographic object.

12. The system according to claim 11, wherein the specified area includes a plurality of persons, and wherein:
the control system separates the plurality of persons in the specified area into a first group and a second group based on defined attentiveness of the plurality of persons to the holographic object, said first group of persons having an attentiveness to the holographic object below a specified level; and
the control system determines an aggregated field of view for said first group of persons, and determines the sight zone from said aggregated field of view.

13. The system according to claim 12, wherein the control system includes:
a component for identifying first and second activities of the plurality of persons in the specified area;
a component for identifying one or more of the plurality of persons in the specified area as engaged in the first activity, identifying one or more of the plurality of persons in the specified area as engaged in the second activity, and
a component for grouping the identified one or more persons engaged in the first activity into the first group, and grouping the identified one or more persons engaged in the second activity into the second group.

14. The system according to claim 12, wherein a specified level of attentiveness comprises a threshold time duration a person looks away from a specified viewpoint, said user identification system further monitoring how long a user looks away from the specified viewpoint to determine that user's attentiveness to the holographic object.

15. A computer readable program storage device comprising:
a computer readable storage medium having program instructions embodied therein, the program instructions executable by a computer to cause the computer to perform the method of:
creating, by a holographic projector, a three-dimensional (3D) holographic object in mid-air in a specified area of the real world environment;
identifying a multitude of persons engaged in activities requiring line-of-sight viewing of objects within the specified area of the real world environment, the identifying including identifying a first group of persons from said multitude of persons in the specified area as having an aggregated line of sight viewing of another object and a collective attentiveness to the 3D holographic object below a specified level indicating no interest or a defined low interest in line-of-sight viewing of the 3D holographic object and including identifying a second group of persons engaged in an activity involving said 3D holographic object;

determining an aggregate sight zone corresponding to said aggregated line-of-sight viewing of the another object in the specified area for the identified first group of persons while engaged in said activities; and controlling the holographic projector to control a location of the 3D holographic object to keep the holographic object outside of said determined aggregate sight zone, said controlling the holographic projector comprising:

determining an allow zone for the holographic object outside of the aggregate sight zone;

keeping the holographic object in the allow zone; and the holographic projector controlling a moving the holographic object from one location in the allow zone to another location in the allow zone, including identifying a path within the allow zone, between said one location and said another location, wherein:

the controlling a location of the holographic object includes keeping the 3D holographic object in said path as the 3D holographic object moves from said one location to said another location while said second group of persons engage in said activity involving said 3D holographic object.

16. The computer readable program storage device according to claim 15, wherein the specified area includes a plurality of persons, and wherein:

the identifying at least one person in the specified area includes separating the plurality of persons in the specified area into a first group and a second group based on defined attentiveness of the plurality of persons to the holographic object, said first group of persons having an attentiveness to the holographic object below a specified level; and the determining a sight zone in the specified area includes determining an aggregated field of view for said first group of persons, and determining the sight zone from said aggregated field of view.

17. The computer readable program storage device according to claim 16, wherein the separating the plurality of persons in the specified area includes:

identifying first and second activities of the plurality of persons in the specified area;

identifying one or more of the plurality of persons in the specified area as engaged in the first activity, and identifying one or more of the plurality of persons in the specified area as engaged in the second activity; and grouping the identified one or more persons engaged in the first activity into the first group, and grouping the identified one or more persons engaged in the second activity into the second group.

* * * * *